(12) United States Patent
Broda et al.

(10) Patent No.: US 10,601,674 B2
(45) Date of Patent: Mar. 24, 2020

(54) VIRTUAL USER RAMP CONTROLLER FOR LOAD TEST ANALYTIC DASHBOARD

(71) Applicant: Akamai Technologies, Inc., Cambridge, MA (US)

(72) Inventors: Tal Broda, Sunnyvale, CA (US); Ed Salazar, Santa Clara, CA (US); Craig R. Powers, San Francisco, CA (US); Kenneth C. Gardner, Palo Alto, CA (US); Daniel J. Bartow, San Diego, CA (US); Kendall Cosby, Aurora, CO (US); Ben Bubenheim, San Francisco, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 543 days.

Patent file contains an affidavit/declaration under 37 CFR 1.130(b).

(21) Appl. No.: 14/172,045

(22) Filed: Feb. 4, 2014

(65) Prior Publication Data
US 2015/0222494 A1 Aug. 6, 2015

(51) Int. Cl.
*G06F 3/0484* (2013.01)
*H04L 12/24* (2006.01)
*H04L 12/26* (2006.01)

(52) U.S. Cl.
CPC .............. *H04L 41/22* (2013.01); *H04L 43/50* (2013.01)

(58) Field of Classification Search
CPC ........... G06F 11/3414; G06F 2201/875; G06F 11/3409; G06F 11/3433; G06F 2201/87
See application file for complete search history.

(56) References Cited

U.S. PATENT DOCUMENTS

| | | | |
|---|---|---|---|
| 5,414,809 A | 5/1995 | Hogan et al. | |
| 5,615,347 A * | 3/1997 | Davis .................. | G06F 3/04847 715/804 |
| 5,724,525 A | 3/1998 | Beyers et al. | |
| 5,945,986 A | 8/1999 | Bargar et al. | |
| 6,025,853 A | 2/2000 | Baldwin | |
| 6,092,043 A | 7/2000 | Squires et al. | |
| 6,134,582 A | 10/2000 | Kennedy | |
| 6,317,786 B1 | 11/2001 | Yamane et al. | |

(Continued)

OTHER PUBLICATIONS

"Editing Load Patterns to Model Virtual User Activities", Microsoft, Oct. 5, 2013, Visual Studio, https://msdn.microsoft.com/en-us/library/dd997551(v=vs.120).aspx#editing_loadpatternschanging.*

(Continued)

*Primary Examiner* — Namitha Pillai (57) ABSTRACT

A method includes providing a graphical user interface (GUI) that allows a user to dynamically change virtual user (VU) distributions of a load test performed on a target website or web application during test run-time. The GUI allowing the user to make a change to a current ramp profile of one or more VU distributions responsive to application of first user input. The first input including dragging an icon to a position in a first graph, the position denoting a future number of VUs at a future time. Following application of the first input, the change to the current ramp profile is visually displayed on a second graph in real-time as the load test progresses.

26 Claims, 9 Drawing Sheets

(56) References Cited

U.S. PATENT DOCUMENTS

| | | |
|---|---|---|
| 6,434,513 B1 | 8/2002 | Sherman et al. |
| 6,477,483 B1 | 11/2002 | Scarlat et al. |
| 6,542,163 B2 | 4/2003 | Gorbet et al. |
| 6,560,564 B2 | 5/2003 | Scarlat et al. |
| 6,563,523 B1 | 5/2003 | Suchocki et al. |
| 6,601,020 B1 | 7/2003 | Myers |
| 6,738,933 B2 | 5/2004 | Fraenkel et al. |
| 6,792,393 B1 | 9/2004 | Farel et al. |
| 6,817,010 B2 | 11/2004 | Aizenbud-Reshef et al. |
| 6,898,556 B2 | 5/2005 | Smocha et al. |
| 6,959,013 B1 | 10/2005 | Muller et al. |
| 6,975,963 B2 | 12/2005 | Hamilton et al. |
| 7,050,056 B2 | 5/2006 | Meyringer |
| 7,133,805 B1 | 11/2006 | Dankenbring et al. |
| 7,216,168 B2 | 5/2007 | Merriam |
| 7,334,162 B1 | 2/2008 | Vakrat et al. |
| 7,376,902 B2 | 5/2008 | Lueckhoff |
| 7,464,121 B2 | 12/2008 | Barcia et al. |
| 7,478,035 B1 | 1/2009 | Wrench et al. |
| 7,548,875 B2 | 6/2009 | Mikkelsen et al. |
| 7,587,638 B2 | 9/2009 | Shah et al. |
| 7,594,238 B2 | 9/2009 | Takahashi |
| 7,607,169 B1 | 10/2009 | Njemanze et al. |
| 7,617,201 B1 | 11/2009 | Bedell et al. |
| 7,630,862 B2 | 12/2009 | Glas et al. |
| 7,685,234 B2 | 3/2010 | Gottfried |
| 7,689,455 B2 | 3/2010 | Fligler et al. |
| 7,693,947 B2 | 4/2010 | Judge et al. |
| 7,725,812 B1 | 5/2010 | Balkus et al. |
| 7,743,128 B2 | 6/2010 | Mullarkey |
| 7,757,175 B2 | 7/2010 | Miller |
| 7,844,036 B2 | 11/2010 | Gardner et al. |
| 7,965,643 B1 | 6/2011 | Gilbert et al. |
| 8,015,327 B1 | 9/2011 | Zahavi et al. |
| 8,060,581 B2 | 11/2011 | Day et al. |
| 8,166,458 B2 | 4/2012 | Li et al. |
| 8,291,079 B1 | 10/2012 | Colton et al. |
| 8,306,195 B2 | 11/2012 | Gardner et al. |
| 8,341,462 B2 | 12/2012 | Broda et al. |
| 8,448,148 B1 | 5/2013 | Kolawa et al. |
| 8,464,224 B2 | 6/2013 | Dulip et al. |
| 8,479,122 B2 | 7/2013 | Hotelling et al. |
| 8,510,600 B2 | 8/2013 | Broda et al. |
| 8,583,777 B1 | 11/2013 | Boyle et al. |
| 9,015,348 B2 | 4/2015 | Hofmann et al. |
| 9,015,654 B2 | 4/2015 | Kaasila et al. |
| 9,021,362 B2 | 4/2015 | Broda et al. |
| 9,026,661 B2 | 5/2015 | Swildens et al. |
| 9,154,611 B1 | 10/2015 | Jackson et al. |
| 9,229,842 B2 | 1/2016 | Broda et al. |
| 9,251,035 B1 | 2/2016 | Vazac et al. |
| 9,384,121 B2 | 7/2016 | Jackson et al. |
| 9,436,579 B2 | 9/2016 | Broda et al. |
| 9,450,834 B2 | 9/2016 | Gardner et al. |
| 9,491,248 B2 | 11/2016 | Broda et al. |
| 9,495,473 B2 | 11/2016 | Gardner et al. |
| 9,720,569 B2 | 8/2017 | Gardner et al. |
| 9,882,793 B2 | 1/2018 | Broda et al. |
| 9,942,105 B2 | 4/2018 | Gardner et al. |
| 9,990,110 B1 | 6/2018 | Lounibos et al. |
| 10,037,393 B1 | 7/2018 | Polovick et al. |
| 10,067,850 B2 | 9/2018 | Vazac et al. |
| 10,114,915 B2 | 10/2018 | Polovick et al. |
| 10,177,999 B2 | 1/2019 | Broda et al. |
| 10,346,431 B1 | 7/2019 | Broda et al. |
| 2002/0107826 A1 | 8/2002 | Ramachandran et al. |
| 2002/0138226 A1 | 9/2002 | Doane |
| 2002/0147937 A1 | 10/2002 | Wolf |
| 2003/0074161 A1 | 4/2003 | Smocha et al. |
| 2003/0074606 A1 | 4/2003 | Boker |
| 2003/0109951 A1 | 6/2003 | Hsiung et al. |
| 2003/0130982 A1 | 7/2003 | Kasriel et al. |
| 2003/0195960 A1 | 10/2003 | Merriam |
| 2004/0010584 A1 | 1/2004 | Peterson et al. |
| 2004/0039550 A1 | 2/2004 | Myers |
| 2004/0059544 A1 | 3/2004 | Smocha et al. |
| 2004/0064293 A1 | 4/2004 | Hamilton et al. |
| 2004/0119713 A1 | 6/2004 | Meyringer |
| 2004/0123320 A1 | 6/2004 | Daily et al. |
| 2004/0205724 A1 | 10/2004 | Mayberry |
| 2005/0027858 A1 | 2/2005 | Sloth et al. |
| 2005/0102318 A1 | 5/2005 | Odhner et al. |
| 2005/0182589 A1 | 8/2005 | Smocha et al. |
| 2005/0216234 A1 | 9/2005 | Glas et al. |
| 2005/0278458 A1 | 12/2005 | Berger et al. |
| 2006/0031209 A1 | 2/2006 | Ahlberg et al. |
| 2006/0075094 A1 | 4/2006 | Wen et al. |
| 2006/0229931 A1 | 10/2006 | Fligler et al. |
| 2006/0271700 A1 | 11/2006 | Kawai et al. |
| 2007/0143306 A1 | 6/2007 | Yang |
| 2007/0232237 A1 | 10/2007 | Croak et al. |
| 2007/0282567 A1 | 12/2007 | Dawson et al. |
| 2007/0283282 A1 | 12/2007 | Bonfiglio et al. |
| 2007/0288205 A1 | 12/2007 | Vazquez et al. |
| 2008/0049641 A1 | 2/2008 | Edwards et al. |
| 2008/0059947 A1 | 3/2008 | Anand et al. |
| 2008/0066009 A1 | 3/2008 | Gardner et al. |
| 2008/0140347 A1 | 6/2008 | Ramsey et al. |
| 2008/0147462 A1 | 6/2008 | Muller |
| 2008/0189408 A1 | 8/2008 | Cancel et al. |
| 2008/0235075 A1 | 9/2008 | Couture et al. |
| 2009/0077107 A1 | 3/2009 | Scumniotales et al. |
| 2009/0210890 A1 | 8/2009 | Tully |
| 2009/0271152 A1 | 10/2009 | Barrett |
| 2009/0300423 A1 | 12/2009 | Ferris |
| 2010/0023867 A1 | 1/2010 | Coldiron et al. |
| 2010/0057935 A1 | 3/2010 | Kawai et al. |
| 2010/0115496 A1 | 5/2010 | Amichai |
| 2010/0198960 A1 | 8/2010 | Kirschnick et al. |
| 2010/0250732 A1 | 9/2010 | Bucknell |
| 2010/0251128 A1 | 9/2010 | Cordasco |
| 2010/0332401 A1 | 12/2010 | Prahlad et al. |
| 2010/0333072 A1 | 12/2010 | Dulip et al. |
| 2011/0066591 A1 | 3/2011 | Moyne et al. |
| 2011/0066892 A1 | 3/2011 | Gardner et al. |
| 2011/0119370 A1 | 5/2011 | Huang et al. |
| 2011/0130205 A1 | 6/2011 | Cho et al. |
| 2011/0191465 A1 | 8/2011 | Hofstaedter et al. |
| 2011/0202517 A1 | 8/2011 | Reddy et al. |
| 2011/0282642 A1 | 11/2011 | Kruger et al. |
| 2011/0096108 A1 | 12/2011 | Agrawal et al. |
| 2012/0017165 A1 | 1/2012 | Gardner et al. |
| 2012/0017210 A1 | 1/2012 | Huggins et al. |
| 2012/0023429 A1 | 1/2012 | Medhi |
| 2012/0101799 A1 | 4/2012 | Fernandes |
| 2012/0166634 A1 | 6/2012 | Baumback et al. |
| 2012/0246310 A1 | 9/2012 | Broda et al. |
| 2012/0314616 A1 | 12/2012 | Hong et al. |
| 2012/0324101 A1 | 12/2012 | Pecjack et al. |
| 2013/0031449 A1 | 1/2013 | Griffiths et al. |
| 2013/0097307 A1 | 4/2013 | Vazac et al. |
| 2013/0116976 A1 | 5/2013 | Kanemasa et al. |
| 2013/0166634 A1 | 6/2013 | Holland |
| 2013/0205020 A1 | 8/2013 | Broda et al. |
| 2014/0033055 A1 | 1/2014 | Gardner et al. |
| 2014/0189320 A1 | 7/2014 | Kuo |
| 2014/0280880 A1 | 9/2014 | Tellis et al. |
| 2015/0067527 A1 | 3/2015 | Gardner et al. |
| 2015/0095471 A1 | 4/2015 | Singh et al. |
| 2015/0319071 A1 | 11/2015 | Kaasila et al. |
| 2018/0011774 A1 | 1/2018 | Vazac et al. |
| 2018/0246626 A1 | 8/2018 | Lounibos et al. |

OTHER PUBLICATIONS

"Walkthrough: Creating and Running a Load Test Containing Unit Tests", May 20, 2010, Microsoft, https://msdn.microsoft.com/en-us/library/ff355993.aspx.*

"Change data markers in a line, scatter, or radar chart", Microsoft, Excel 2007, https://support.office.com/en-us/article/Change-data-markers-in-a-line-scatter-or-radar-chart-8e91c157-1c9c-4852-9657-1e2e1317f415.*

(56) References Cited

OTHER PUBLICATIONS

"Testing Application Performance and Stress", Visual Studios 2010, Microsoft.*

MTS FlexTest Controller Family, MTS, May 11, 2011.*

Dillenseger, "CLIF, a framework based on Fractal for flexible, distributed load testing" Nov. 18, 2008, Ann. Telecommun., 64:101-120.

Malan et al. "An Extensible Probe Architecture for Network Protocol Performance Measurement", IEEE, Oct. 1998, pp. 215-227.

Jamin et al. "A Measurement-Based Admission Control Algorithm for Integrated Service Packet Networks", IEEE, 1997, pp. 56-70.

Chester et al., "Mastering Excel 97", 1994, Sybex, 4th Ed., pp. 1016, 136-137, 430, 911, 957-958.

"How to: Change the Load Pattern", Microsoft Visual Studios 2010, https://msdn.microsoft.com/en-us/library/s182586(v=vs.100).aspx.

Microsoft Visual Studios article, "How to: Change the Load Pattern" dated Feb. 3, 2013, https://docs.microsoft.com/en-us/previous-versions/visualstudio/visual-studio-2010/ms182586(v=vs.100).

U.S. Appl. No. 14/668,928, filed Mar. 25, 2015 available in IFW.
U.S. Appl. No. 15/066,969, filed Mar. 10, 2016 available in IFW.
U.S. Appl. No. 15/155,185, filed May 16, 2016 available in IFW.
U.S. Appl. No. 15/441,718, filed Feb 24, 2017 available in IFW.
U.S. Appl. No. 15/448,954, filed Mar. 3, 2017 available in IFW.
U.S. Appl. No. 15/449,061, filed Mar. 3, 2017 available in IFW.
U.S. Appl. No. 15/591,353, filed May 10, 2017 available in IFW.
U.S. Appl. No. 15/668,002, filed Aug 3, 2017 available in IFW.
U.S. Appl. No. 15/862,503, filed Jan 4, 2018 available in IFW.

Microsoft Visual Studios article, "Analyzing Load Tests Results Using the Load Test Analyzer" dated Feb. 3, 2013, https://docs.microsoft.com/en-us/previous-versions/visualstudio/visual-studio-2010/ee923686(v=vs.100), 5 pages.

Microsoft Visual Studios article, "Load Test Scenario Properties" dated Feb. 3, 2013, https://docs.microsoft.com/en-us/previous-versions/visualstudio/visual-studio-2010/ff406966(v=vs.100), 5 pages.

Microsoft Visual Studios article, "Editing Load Patterns to Model Virtual User Activities" dated Feb. 3, 2013, https://docs.microsoft.com/en-us/previous-versions/visualstudio/visual-studio-2010/dd997551(v=vs.100)?redirectedfrom=MSDN, 6 pages.

Microsoft Visual Studios article, "How to: Create a Load Pattern in the Load New Test Wizard" dated Feb. 3, 2013, https://docs.microsoft.com/en-us/previous-versions/visualstudio/visual-studio-2010/ms182574(v=vs.100), 3 pages.

Microsoft Visual Studios article, "Testing Application Performance and Stress" dated Feb. 3, 2013, https://docs.microsoft.com/en-us/previous-versions/visualstudio/visual-studio-2010/dd293540(v=vs.100)?redirectedfrom=MSDN, 7 pages.

"Microsoft Visual Studio - Wikipedia", https://en.wikipedia.org/w/index.php?title=Microsoft_Visual_Studio&oldid=535495681, Jan. 29, 2013, 9 pages.

Microsoft Visual Studios article, "How to: Create a Web Performance Test Plug-In" dated Feb. 3, 2013, https://docs.microsoft.com/en-us/previous-versions/visualstudio/visual-studio-2010/ms243191(v=vs.100), 5 pages.

Microsoft Visual Studios article, "How to: Create a Load Test Plug-In" dated Feb. 3, 2013, https://docs.microsoft.com/en-us/previous-versions/visualstudio/visual-studio-2010/ms243153(v=vs.100), 6 pages.

Transmittal Letter submitted herewith, dated Nov. 26, 2019.
Transmittal Letter filed herewith on Nov. 27 2019, 2 pages.

* cited by examiner

VIRTUAL USER RAMP CONTROLLER FOR LOAD TEST ANALYTIC DASHBOARD

TECHNICAL FIELD

The present disclosure relates generally to cloud computing; more particularly, to automated systems and methods for functional and/or load testing of websites, as well as to user interface tools for controlling aspects of a load test.

BACKGROUND

In the modern world of e-commerce, social media, and cloud computing the financial stakes are enormous when a company's website crashes. For example, website downtime for a company like Twitter® has been estimated at roughly $25 million dollars per minute. Therefore it is imperative that a business enterprise adequately test their websites and web applications prior to initial launch—not only to avoid catastrophic failures, but also to ensure the best user experience possible.

Real-time, web-based, application performance testing, also known as load testing, utilizes the global supply of regional cloud providers to run tests on a website or web application by simulating the browsing activities of hundreds of thousands—or even millions—of concurrent virtual users. Cloud-based load testing makes it possible for a business enterprise to simulate huge numbers of users on a website within a matter of minutes. Performance or load testing thus provides a company with the ability to determine a system's behavior under both normal and anticipated peak load conditions. Further, load testing can be used to identify the maximum operating capacity of an application and also determine which components are causing performance problems or degradations.

In one known approach, an array of load servers is deployed in the cloud to generate a test load on a target website. By way of background, U.S. Pat. No. 8,341,462, which is herein incorporated by reference, describes a computerized method that creates a grid comprising a collection of interconnected load servers and result servers that may then be used to run a load test on a target website or web application. The load servers play a predefined test composition, which generates a load on a target (customer) website or web application. The load generated by the load servers typically consists of a trapezoidal-shaped ramp profile, with a linear ramp-up of a predetermined number of virtual users (e.g., 100,000) followed by a flat, plateau time duration where the number of virtual users remains constant, and then a gradual ramp-down period. While the test composition is running, the load servers also function to report back results of the load test and statistics in real-time. Analytic or result servers are deployed and utilized primarily to collect the real-time test results from the load servers, aggregate those results, and store them in a database. By way of further background, U.S. Pat. No. 7,844,036, which is herein incorporated by reference, discloses a graphical user interface (GUI) that allows a user to compose a test scenario by dragging and dropping various message clips into tracks to generate complex parallel message streams for load testing purposes.

Enterprises are interested in changing the virtual user distributions on-the-fly while the load test is running. That is, they would like to change the number of virtual users, increasing or decreasing distributed virtual user traffic loads while test compositions are running. Traditional load testing systems and tools have lacked the ability to make changes and adjustments to virtual user distributions and profiles without stopping or rescheduling the test.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

DETAILED DESCRIPTION

In the following description specific details are set forth, such as server types, cloud providers, distributions, process steps, user interfaces, etc., in order to provide a thorough understanding of the subject matter disclosed herein. However, persons having ordinary skill in the relevant arts will appreciate that these specific details may not be needed to practice the present invention. It should also be understood that the elements in the FIG.s are representational, and are not necessarily drawn to scale in the interest of clarity.

References throughout this description to "one embodiment", "an embodiment", "one example" or "an example" means that a particular feature, structure or characteristic described in connection with the embodiment or example is included in at least one embodiment. The phrases "in one embodiment", "in an embodiment", "one example" or "an example" in various places throughout this description are not necessarily all referring to the same embodiment or example. Furthermore, the particular features, structures or characteristics may be combined in any suitable combinations and/or sub-combinations in one or more embodiments or examples.

In the context of the present application, the term "cloud" broadly refers to a collection of machine instances, storage and/or network devices that work together in concert. A "public cloud" refers to a cloud that is publically available, i.e., provided by a cloud provider that a user may access via the Internet in order to allocate cloud resources for the purpose of utilizing or deploying software programs and also for running or executing those programs thereon. Some public clouds deliver cloud infrastructure services or Infrastructure as a Service (IaaS). By way of example, Amazon Elastic Compute Cloud (also known as "EC2™") is a web service that allows users to rent computers on which to run their own computer applications, thereby allowing scalable deployment of applications through which a user can create a virtual machine (commonly known as an "instance") containing any software desired. The term "elastic" refers to the fact that user can create, launch, and terminate server instances as needed, paying by the hour for active servers. Another leading software platform in the cloud is Microsoft Azure™, an application platform in the cloud that allows applications to be hosted and run at Microsoft datacenters.

The term "server" broadly refers to any combination of hardware or software embodied in a computer (i.e., a machine "instance") designed to provide services to client devices or processes. A server therefore can refer to a computer that runs a server operating system from computer-executable code stored in a memory, and which is provided to the user as virtualized or non-virtualized server; it can also refer to arty software or dedicated hardware capable of providing computing services.

In the context of the present disclosure, load servers (also referred to as test servers) are servers deployed and utilized primarily to generate a test load on a target website. That is, load servers play the test composition, generating a load on a target (customer) website and web applications. Load servers also function to report back results of the load test, and may also generate statistics in real-time. "Analytic" or "result" servers are deployed and utilized primarily to collect the real-time test results from the load servers, aggregate those results, stream the results to real-time analytic dashboards, and store them in a database.

The term "real-time" refers to a level of computer responsiveness that a user senses as sufficiently immediate or that enables the computer to keep up with some external process (for example, to present visualizations of load test results as it constantly changes). Thus, real-time is a mode of computer operation in which the computer collects data, analyzes or computes with the data, reports (e.g., visually displays) and/or stores the results nearly simultaneously, i.e., within seconds or milliseconds.

In the context of the present application, a "widget" refers for the part of a GUI that allows a user to interface with an application and/or operating system. Widgets display information and invite the user to act in a number of ways. Widgets may include buttons, dialog boxes, pop-up windows, selection boxes, windows, toggle switches, slider or fader switches, and forms. The term widget also can be used to refer to either the graphic component or its controlling program or a combination of both.

A "grid" or "test grid" refers to a collection of interconnected servers that may be used to run a load test on a target website or web application. As disclosed herein, a computer program or grid wizard may be utilized to automatically determine the global, cross-cloud, resources needed to execute a test or measurement. Furthermore, the computer program can automatically allocate those server resources required for the test or measurement across multiple different cloud providers; verifies that the allocated servers are operational; and that the allocated servers are running the proprietary software or computer program product correctly. The computer program or product also monitors the allocated servers, replacing non-operational servers (when allocated, and during execution of the test or measurements) and displays results from multiple globally distributed clouds in a real-time streaming dashboard which requires no user initiated refresh.

In one embodiment, a method, system, and computer program product is provided for allowing a user (customer) to dynamically change or adjust virtual user distributions of a load test on a target website or web application during test run-time, i.e., when the computer code or software program implementing the load test is actually running or executing. In a specific implementation, a graphical user interface (GUI) or widget is provided for an analytic dashboard that allows virtual user groups or distributions to be changed on-the-fly using audio mixer style slider or fader controls, in conjunction with, or as an alternative to, dynamic ramp changes implemented using other types of controller input. Other types of user-initiated controller input include keyboard, touch screen, verbal/audio, mouse movement, etc.

User groups may correspond to portions or collections of different virtual users that are performing different actions at different times with respect to the target website or web application. These user groups or user distributions may be adjusted dynamically while the load test is running by sending command information out to the load servers in real-time instructing the load servers to adjust change the current ramp plan. This ability provides numerous advantages in terms of testing speed and granularity, i.e., being able to quickly pinpoint specific bottlenecks or problems inhibiting optimal website performance.

Figure 1:
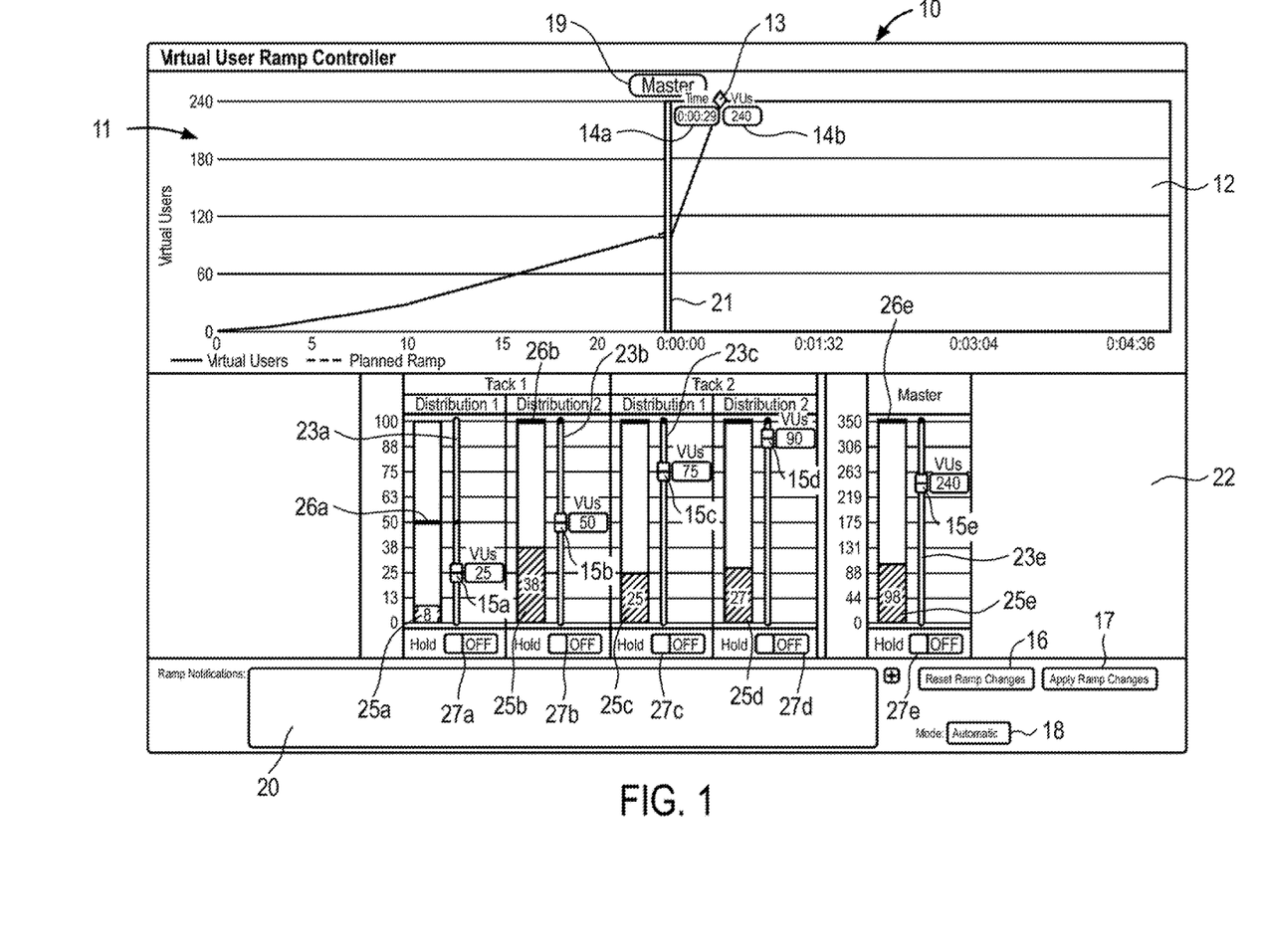
FIG. 1 illustrates an example graphical user interface window that allows controlled dynamic ramp changes of virtual user distributions during the running of a load test composition on a website.

FIG. 1 illustrates an example GUI window 10 that allows controlled dynamic ramp changes of virtual user distributions during the running of a load test composition on a target website or web application. As shown, window 10 includes an upper half portion, which is divided into a left-hand field 11 and a right-hand field 12. Left-hand field 11 shows a graph of the actual virtual user ramp history for a given distribution as the test runs. In the example shown, icon 19 indicates that the virtual user ramp currently shown in field 11 is for the "Master" control, indicative of the sum total number of virtual users for all distributions. The master control may be adjusted by user input in a variety of ways. For instance, a user of GUI window 10 may move the position of slider switch 15e up or down (e.g., clicking and dragging on switch 15e with a cursor) to change the total number of virtual users loading the target website.

Upper right-hand field 12 represents user-selected future changes to the present virtual user (VU) ramp profile. A center line 21 divides left-hand field 11 from right-hand field 12. Center line 21 represents the present or current moment (in real-time) of the load test. Diamond-shaped icon 13 in field 12 may be utilized to adjust the future number of virtual users for the load test. A user may click and drag icon 13 to any position within field 12 to adjust the current user profile ramp. Note that the horizontal axis of fields 11 and 12 corresponds to time, while the vertical axis corresponds to the number of virtual users. As shown, the position of icon 13 is such that the current ramp will be changed to increase up to 240 virtual users over a time period of 29 seconds. This change is also indicated numerically in fields 14a (time) and 14b (# of VUs).

Note that changes to the virtual user ramp profile are not implemented by the load generators or load servers until the user clicks on the "Apply Ramp Changes" button 17. In other words, the load test does not stop during the time that the user (customer) manipulates the various icons, buttons, and slider switches used to modify the future VU ramp profile(s). Desired changes are only applied when the user hits button 17. When button 17 is clicked on, all adjustments/changes made via the slider switches 15 or right-hand field 12 are implemented by the GUI sending instructions to the various load servers that cause the load servers to change the number of VUs according to the new ramp changes. Button 16 may be used to reset any ramp changes previously made.

It is appreciated that through the GUI the user specifies high level changes to be made to one or more virtual user distributions, and then the system automatically responds by computing which load server(s) to adjust and by how much VU load. Adjustments may be made the VU load across multiple servers as appropriate. For example, the user may adjust the VU load for a particular distribution by 10,000 additional virtual users. When the changes to the ramp profile are applied, the system might respond by adding 1,000 new virtual users to each of 10 different load servers, without the user having to specify the division the VUs among the provisioned load servers.

In one embodiment, if a user (customer) makes an adjustment to one or more VU distributions that exceeds the present capacity of the load grid previously provisioned, the load testing system may respond by provisioning additional servers in the cloud, i.e., increasing the number of load servers in the testing grid, as necessary to satisfy the user's request for more load. In one implementation, the user does not need to specifically request one or more load servers; rather, the system may automatically determine that more load servers are needed to satisfy the user's applied changes to the ramp profile(s), and then automatically obtain them from the appropriate cloud providers, provision them (loading the necessary testing software), and start the additional load server(s) to run the test composition and provide the additional load on the target website or web application.

In an alternative embodiment, changes to one or more VU distributions may be made immediately upon dragging/ release of icon 13 or slider switches 15.

The lower portion 22 of window 10 includes an audio panel styled "mixing board" that includes a plurality of slider switches 15 that can be manipulated via user input to change future virtual user distributions for the load test that is currently running. For example, a user may effectuate changes to the master ramp profile by moving the position of slider switch 15e up or down on bar 23e. Note that the shaded bar 25e to the left of bar 23e indicates the actual number of virtual users currently loading the target website. That is, for this example, a sum total of 98 VUs are currently performing programmed actions on the target website. This is reflected in the upper portion of window 10 by the position where the virtual user line of field 11 intersects or meets center line 21. Note further that the 98 VUs shown in bar 25e represent the sum of the virtual user groups or distributions-shown by bars 25a-25d (98=8+38+25+27).

Alternatively, the user may implement similar changes by moving icon 13 (e.g., click-drag-release), or by selecting field 14a or 14b and entering a numerical value (e.g., keypad, or voice input command). In one implementation, any change made according to any of the alternate methods described above, is immediately reflected visually in the other fields of GUI window 10. In other words, if a user moves icon 13 to a new position, the numerical values appearing in fields 14a & 14b will immediately change, as well as the position of slider switch 15e. Likewise, movement of switch 15e will cause icon 13 to change position along with the values shown in fields 14a & 14b.

Lower portion 22 of window 10 also includes slider switches 15a-15d that can be manipulated by a user of GUI window 10 to change future virtual user distributions for the load test that is currently running. Switches 15a-15d thereby provide for adjustments on a more granular level as compared to changes made via master slider switch 15e. In the example of FIG. 1, two different distributions are shown for each of two different tracks of a load test composition. These distributions may be based on a variety of different testing parameters or conditions, including geography, service provider, cloud provider, browser type, etc. The different tracks may correspond to a variety of different virtual user actions performed on the target website, such as "Create Account", "Login", "Search", "Advanced Search", "Browse", etc. Thus, by way of example, Track 1/Distribution 1 may correspond to a "Login" virtual user action performed by EC2 with the servers being located in Virginia; Track 1/Distribution 2 may correspond to a "Login" virtual user action performed by EC2 located in San Francisco; Track 2/Distribution 1 may correspond to a "Search" virtual user action performed by Azure located in Chicago; and Track 2/Distribution 2 may correspond to a "Search" virtual user action performed by Azure located in San Antonio. Practitioners will appreciate that a number of different Track/ Distribution combinations are possible. The GUI shown in FIG. 1 is not limited in the number of tracks or distributions.

It should be further noted that each of the horizontal bold lines 26 located above the virtual user shaded bars 25 represents a maximum number of virtual users for a particular distribution (or master). This limitation may be dictated by load server capacity. For instance, line 26a shows that the maximum number of VUs for Track 1/Distribution 1 is limited to 50; line 26b shows that the maximum number of VUs for Track 1/Distribution 2 is limited to 100, and so on. Each of the corresponding slider switches 15a-15e cannot exceed (i.e., "pegged") this upper limit. Thus, each of the vertical slider bars 23 includes a similar bold line at the same vertical position as its corresponding line 26.

The embodiment shown in FIG. 1 also includes a plurality of "Hold" ON/OFF toggle switches 27 for each of the slider switches 15 in the lower portion 22 of GUI window 10. Each of switches 27 may be toggled ON/OFF by clicking on the corresponding switch. When a particular switch 27 is toggled ON, the corresponding load server(s) are instructed by the GUI to maintain the current level of virtual users, whatever that happens to be, and not deviate either up or down. In other words, the Hold toggle switches 27 may be used to instruct the load server(s) to stop ramping up or down, and just continue as the current VU level. In one implementation, movement of a corresponding slider switch 15 (up or down) will automatically toggle a switch 27 from a Hold/ON position to a Hold/OFF position. Practitioners in the art will appreciate that the Hold function is useful in test diagnostics where a problem develops in a particular distribution. Placing that distribution on Hold allows the rest of the test composition to continue running, with the user retaining the ability to dynamically control the VUs for all distributions.

The example GUI of FIG. 1 also includes a "Ramp Notifications" field 20 located at the bottom of window 10. When a user adjusts one or more future ramp profiles and hits Apply Ramp Changes button 17, a text log is created in field 20 describing exactly what changes are being implemented with respect to the ramp profiles of the load test. This provides the user with a detailed description of the system's response to movement of all the various GUI slider switches, icons, buttons, etc. Note that commands to the load servers responsive to clicking on button 17 are sent asynchronously. That is, the system does not wait for every single command sent to be acknowledged by the server before sending out other or additional commands.

The embodiment of FIG. 1 also includes a Mode field 18, which indicates whether the test is running in automatic or manual mode. Automatic mode means that the VU ramps are following the automated or preprogrammed ramp patterns of the test composition. Manual mode indicates that the user has applied one or more changes to the user distribution ramp profiles. As can be seen, the future ramp profile changes shown in right-hand filed 12 and the audio mixer board settings of lower portion 22 have yet to be applied. That is, the user has not yet clicked on button 17 and the load test is running in automatic mode.

Practitioners will appreciate that GUI shown in FIG. 1 adds considerable value to the customer by providing the dynamic ability to add/subtract VU load to a target website in real-time as the test composition is running. For instance, a user may want to add load to observe the website's performance under additional stress, or reduce load when there are indications that the website or web application is having performance issues.

Figure 2:
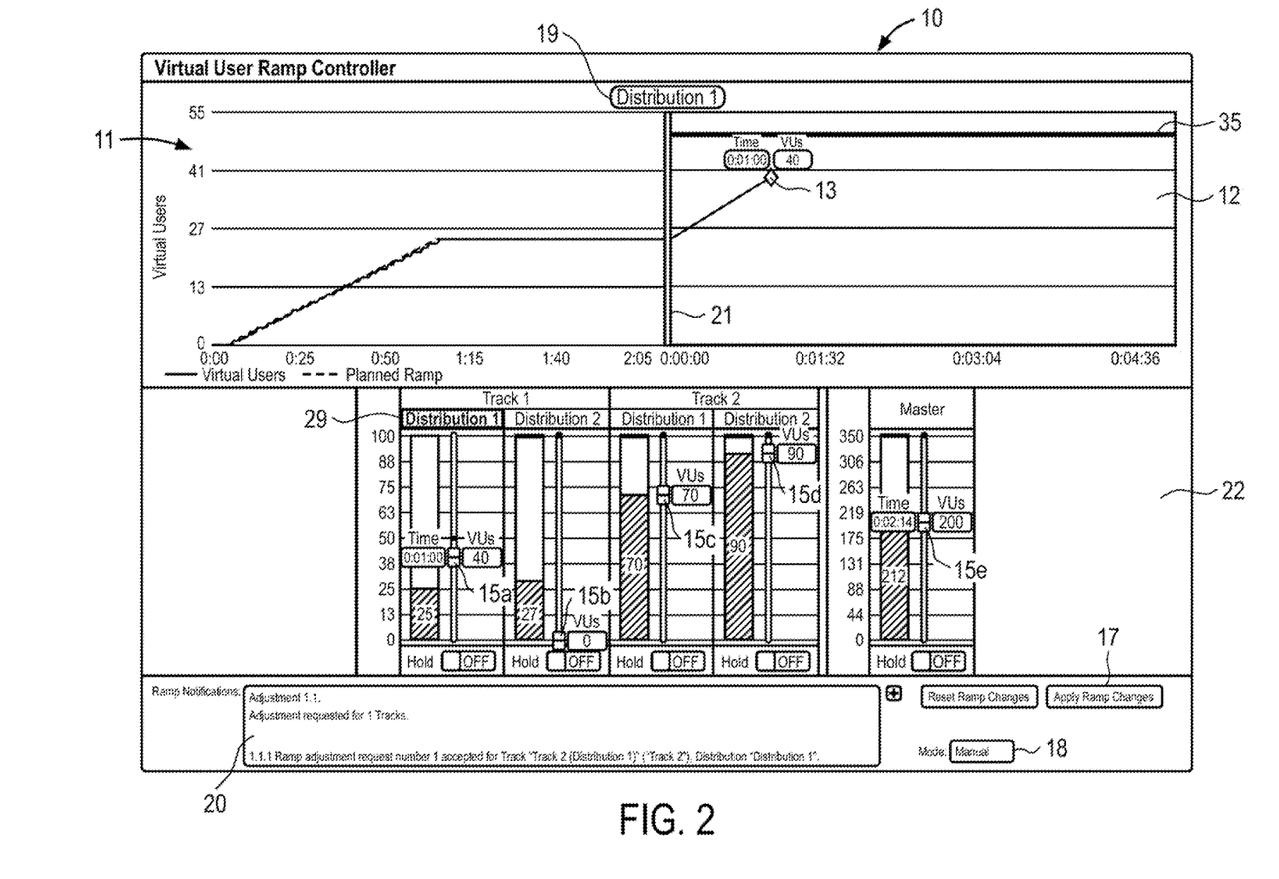
FIG. 2 illustrates an example graphical user interface window with an adjustment to a first distribution at a first point in time during the running of a load test.

FIG. 2 illustrates an example graphical user interface window 10 following an adjustment to a first distribution at a first point in time during the running of a load test. In this example, the user has selected (e.g., clicked on) "Distribution 1" (Track 1) as shown by the bold rectangular box 29. After doing so, icon 19 changes to read "Distribution 1" with the ramp profile of field 11 graphically showing the history of the VU load for Distribution 1. Once selected, the user may make changes to the future ramp profile of Distribution 1 in the manner described above.

For example, the user may move icon 13 to a desired position in field 12, or move slider switch 15*a* up or down in the lower portion 22 of window 10. Note that the horizontal bold line 35 represents the maximum number of virtual users available when making changes. As shown, the user desires to ramp up the number of virtual users from the plateau level of 25 to a new level of 40 in one second. Once button 17 is hit, mode indicator 18 switches to manual mode and field 20 shows a log entry of the changes accepted.

Figure 3:
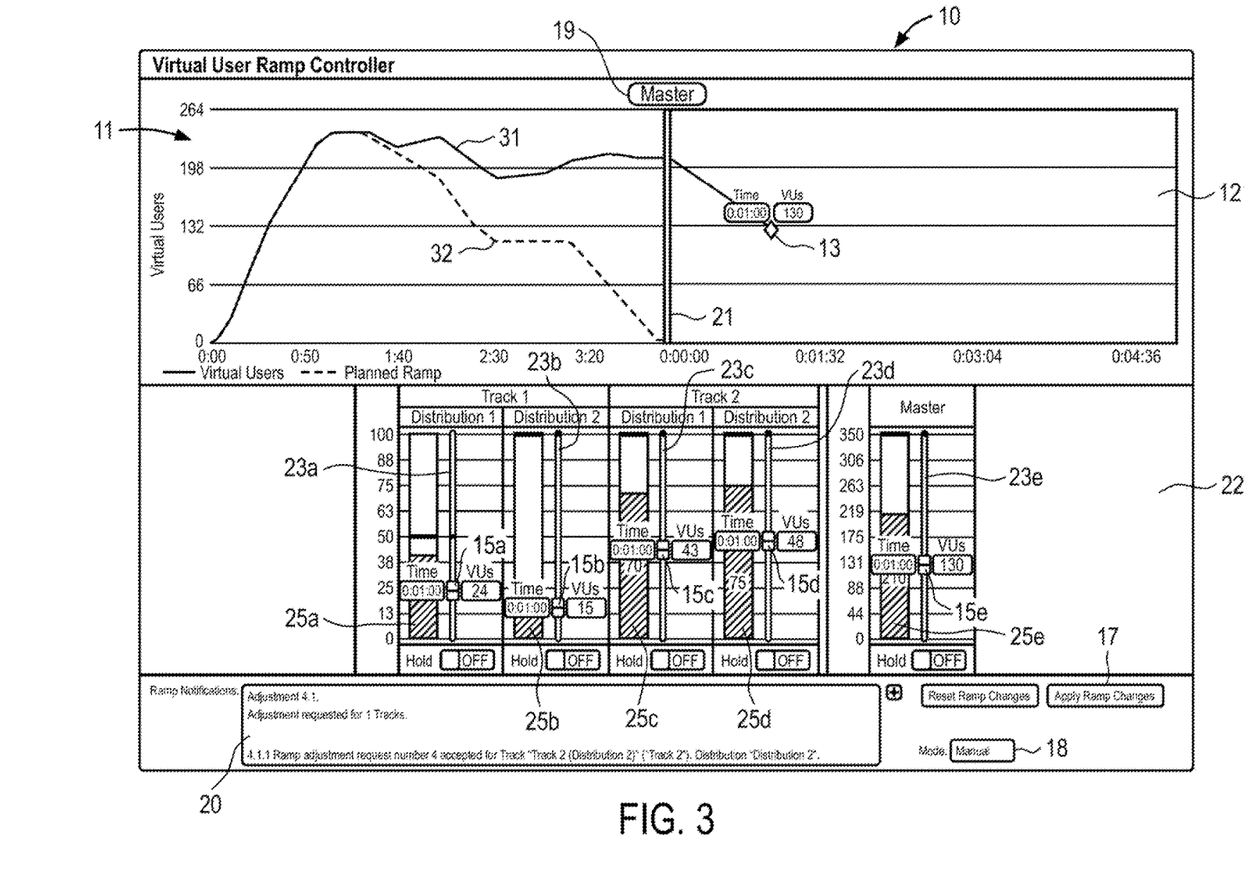
FIG. 3 illustrates an example graphical user interface window with an adjustment made via a Master controller at a second point in time during the running of a load test.

FIG. 3 illustrates an example graphical user interface window 10 following an adjustment made via a Master controller at a second point in time during the running of a load test. As shown, left-hand field 11 shows the history of the load test over the past 4:10 (minutes:seconds). The planned, or preprogrammed, ramp profile is shown by the dashed line 32 in field 11, whereas the actual VU ramp profile implemented for the load test is shown by solid line 31. As can be seen, at about 1 minute into the load test the user began modifying the planned ramp by increasing the total number of virtual users. In this example, the user has made another new ramp change which reduces the total number of virtual users from 210 down to 130, with the change occurring over a time period of 1 minute. This future change is reflected both in the position of icon 13 in field 12 and in the position of slider switch 15*e* in mixer panel portion 22 of GUI window 10. Note that log field 20 indicates that the user has already hit "Apply" button 17, with the ramp adjustment request accepted by the system.

It should be further noted that when a change is made using the master controller (e.g., by clicking and dragging icon 13, or by moving slider switch 15*e* down to a new vertical position), each of the VU distribution slider switches 15*a*-15*d* also move down proportionally. That is, when the Master is selected (as shown in icon 19) and the total number of VUs is changed made using the master controller, each of the individual VU distributions is changed in proportion to the change made via the master controller. The example of FIG. 3 shows that the total number of VUs is to be reduced from 210 to 130, which is about a 38% reduction. This same 38% reduction is automatically applied to each VU distribution. Thus, when the user of GUI 10 moves icon 13 or slider 15*e* down to 130 VUs, similarly proportional changes automatically appear in mixer panel 22 for each of slider switches 15*a*-15*d*. That is, slider 15*a* moves down to reduce the number of VUs of Distribution 1/Track 1 from 40 to 24 VUs; slider 15*b* moves down to reduce the number of VUs of Distribution 2/Track 1 from 25 to 15 VUs; slider 15*c* is re-positioned down to reduce the number of VUs of Distribution 1/Track 2 from 70 to 43 VUs; and slider 15*d* drops down to reduce the number of VUs of Distribution 2/Track 2 from 75 to 48 VUs. In this manner, the sum of the VU changes of each of the distributions equals the total change of the master controller.

In one embodiment, changes made by the user to the one or more slider switches 15 are further visually indicated by color coding of the associated vertical bar 23. In a specific implementation, movement of a slider switch up (adding VUs) causes the portion of the corresponding bar 23 below the switch to turn green. Similarly, movement of a particular slider switch down (reducing VUs) causes the portion of the corresponding bar 23 above the switch to turn orange. For instance, if slider 15*a* is moved downward the portion of vertical bar 23*a* above slider 15*a* would automatically turn orange. Note that if changes are made via the master controller, color coding immediately occurs in bar 23*e* and also bars 23*a*-23*d* of the respective distributions. This type of color coding provides a quick visual indication to the user of the future changes to be made to the ramp profile of each distribution/track. In one embodiment, once the changes are applied by clicking on button 18, the up/down (e.g., orange/green) coloring of the bar(s) 23 is removed.

In one embodiment, a further color coding scheme uses another color (e.g., blue) that fills in the actual current load levels in shaded vertical bars 25, which appear to the left of corresponding bar 23. This additional coloring provides a further visual indication of changes actually being made to the VU populations simulated by the load servers.

Figure 4:
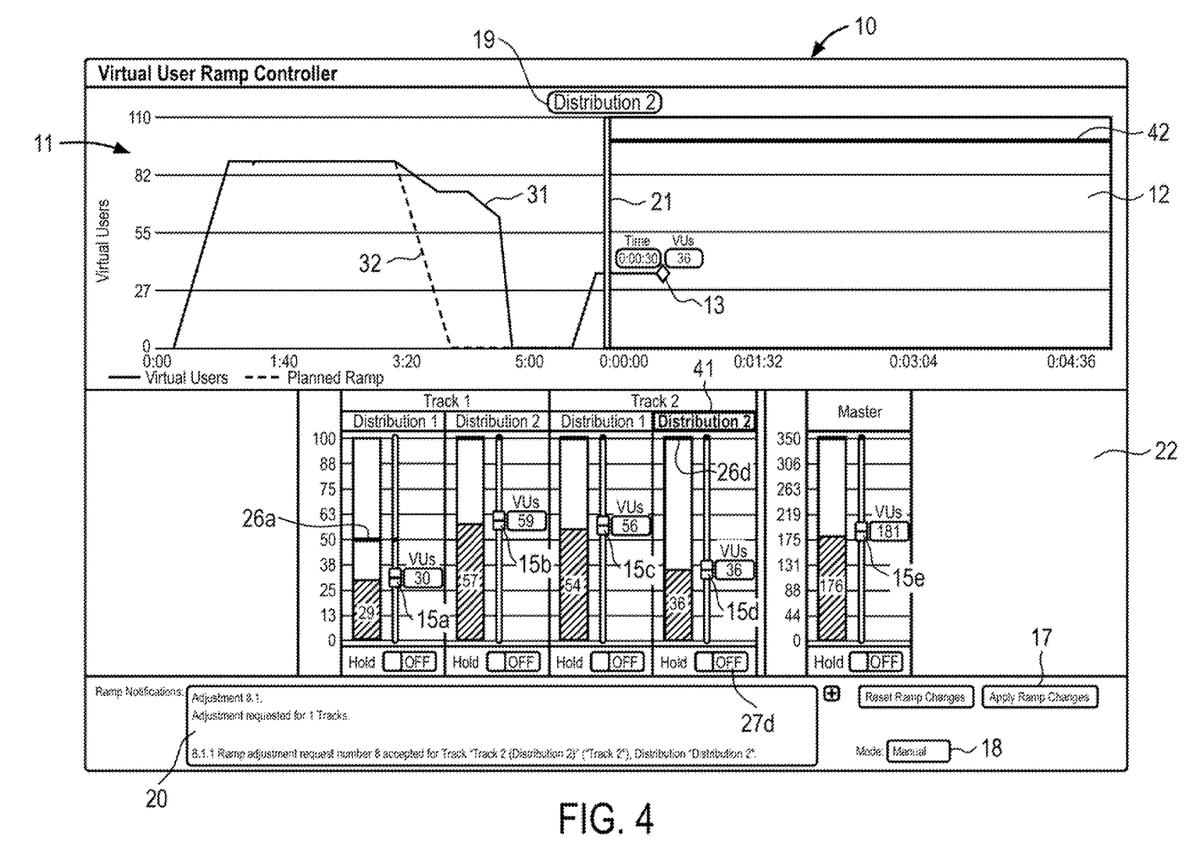
FIG. 4 illustrates an example graphical user interface window with an adjustment to a second distribution at a third point in time during the running of a load test.

FIG. 4 illustrates another example graphical user interface window 10 showing an adjustment to a second distribution at a third point in time during the running of a load test. Note that the user has selected Distribution 2/Track 2 by clicking on rectangular box 41. Distribution 2 appears in icon 19, and the histories of the actual VU ramp profile 31 and planned VU ramp profile 32 are shown in field 11. In this example, the user has not changed the number of VUs for Distribution 2; rather, the user has this simply extended out the plateau of the current VU level for 30 seconds. The same result could also be achieved by toggling Hold switch 27*d* ON. Note that this example illustrates the ability to modify the ramp profile of a single distribution without affecting changes being implemented to the other remaining distributions. FIG. 4 shows that each of the other distributions is currently adding VUs, i.e., ramping up.

Figure 5:
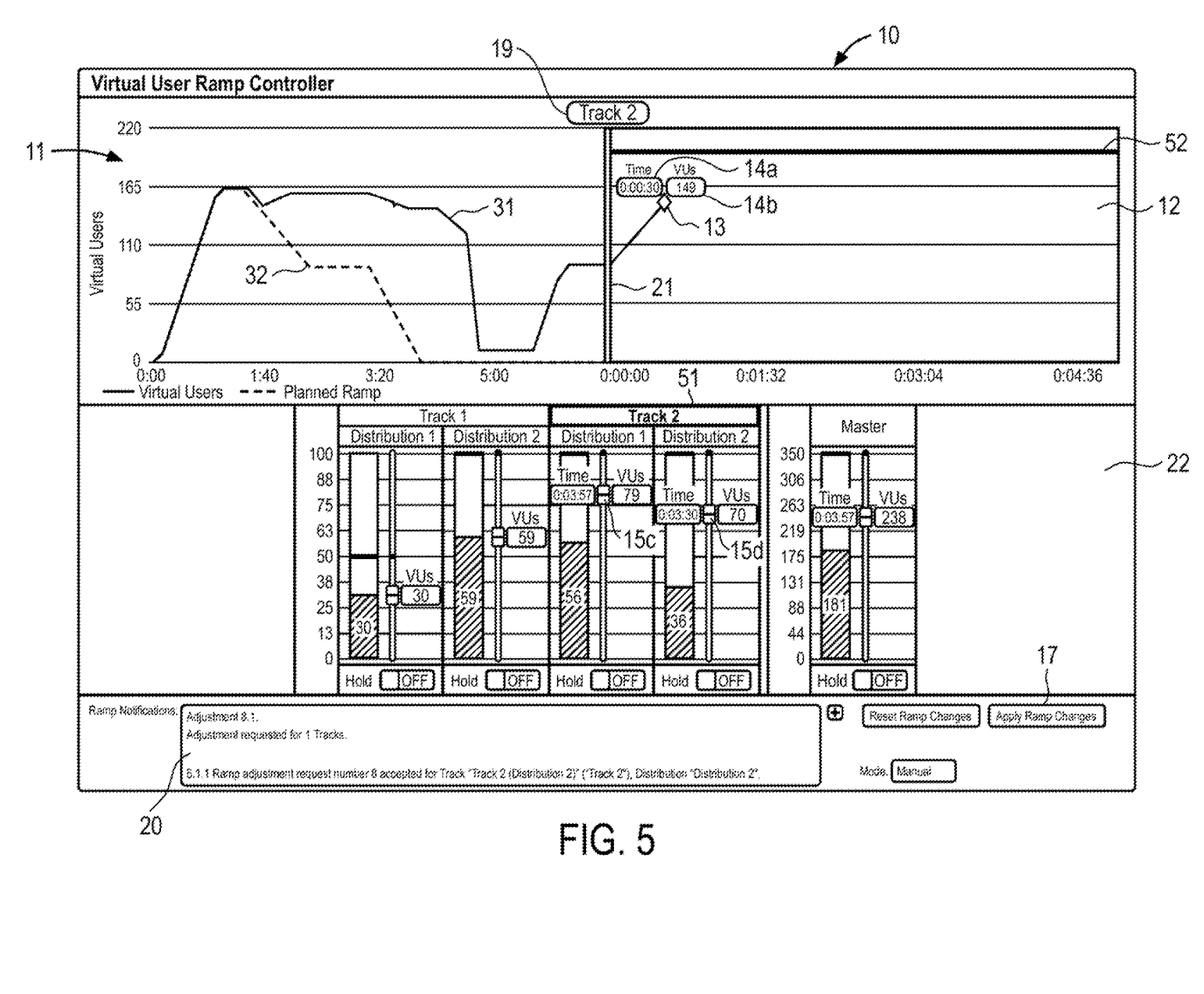
FIG. 5 illustrates an example graphical user interface window with an adjustment to a multiple distribution track of a test composition at a fourth point in time during the running of a load test.

FIG. 5 illustrates an example graphical user interlace window 10 with an adjustment to a multiple distribution track of a test composition at a fourth point in time during the running of a load test. In this example, the user has selected Track 2 for modification, as indicated by the highlighted rectangular box 51 and the "Track 2" indication in icon 19. Field 11 shows the histories of the actual VU ramp profile 31 and planned VU ramp profile 32 for sum total of the VUs in Track 1, i.e., the sum of Distribution 1+Distribution 2 of Track 2. By way of example, Track 2 may correspond to Login activity on the target website, with the two virtual user distributions corresponding to two different server locations (e.g., EC2 Chicago and EC2 New York). Future VU changes to the Track 2 ramp profile made by clicking and dragging icon 13, or by numerical entry in field 14b, are automatically reflected by proportional adjustment of slider switches 15c & 15d of mixer panel 22. In this example, the user has moved control icon 13 upward for a future increase in the VU population of Track 2 from 92 VUs to 149 VUs (23 VUs being added to Distribution 1/Track 2, and 34 VUs being simultaneously added to Distribution 1/Track 2) over a 30 second time period.

Figure 6:
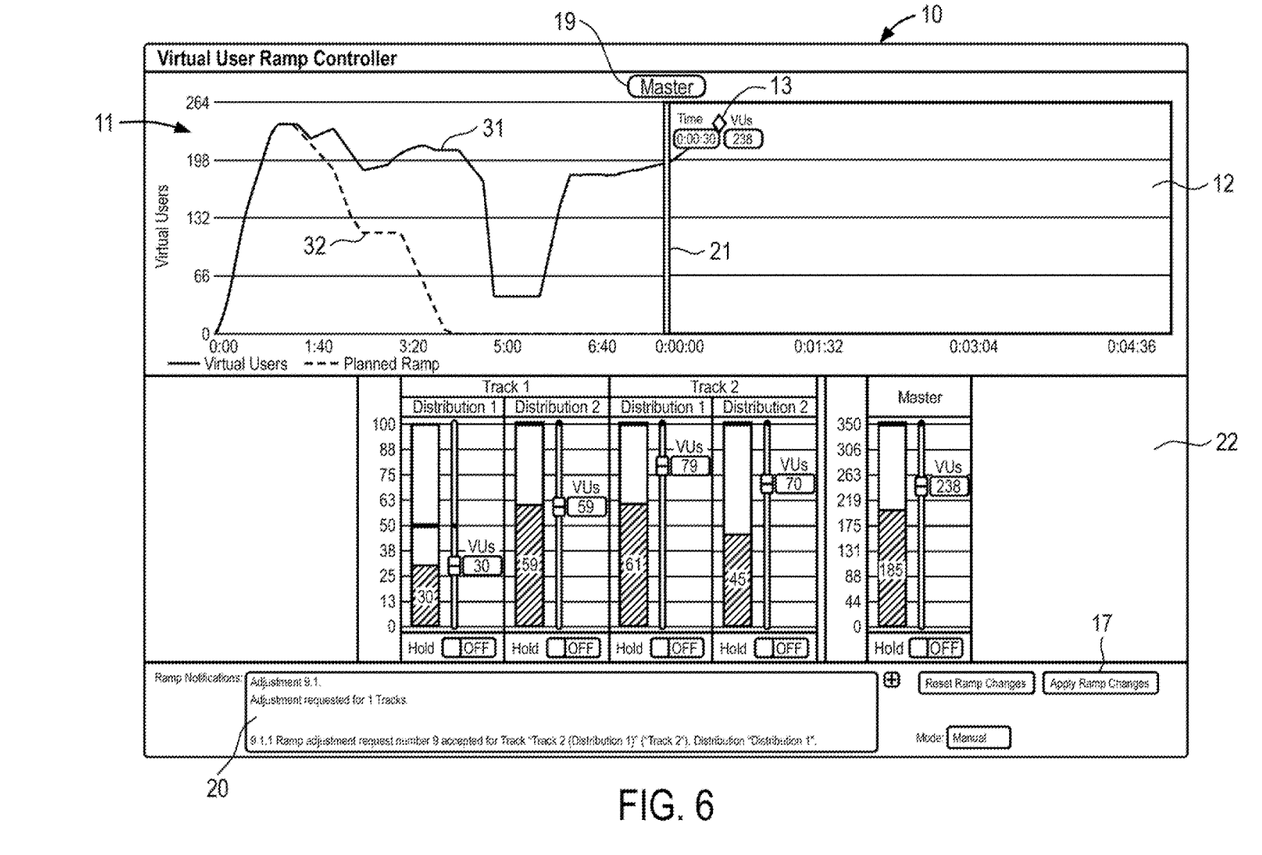
FIG. 6 illustrates an example graphical user interface window with, an adjustment made via a Master controller at a fifth point in time during the running of a load test.
Figure 7:
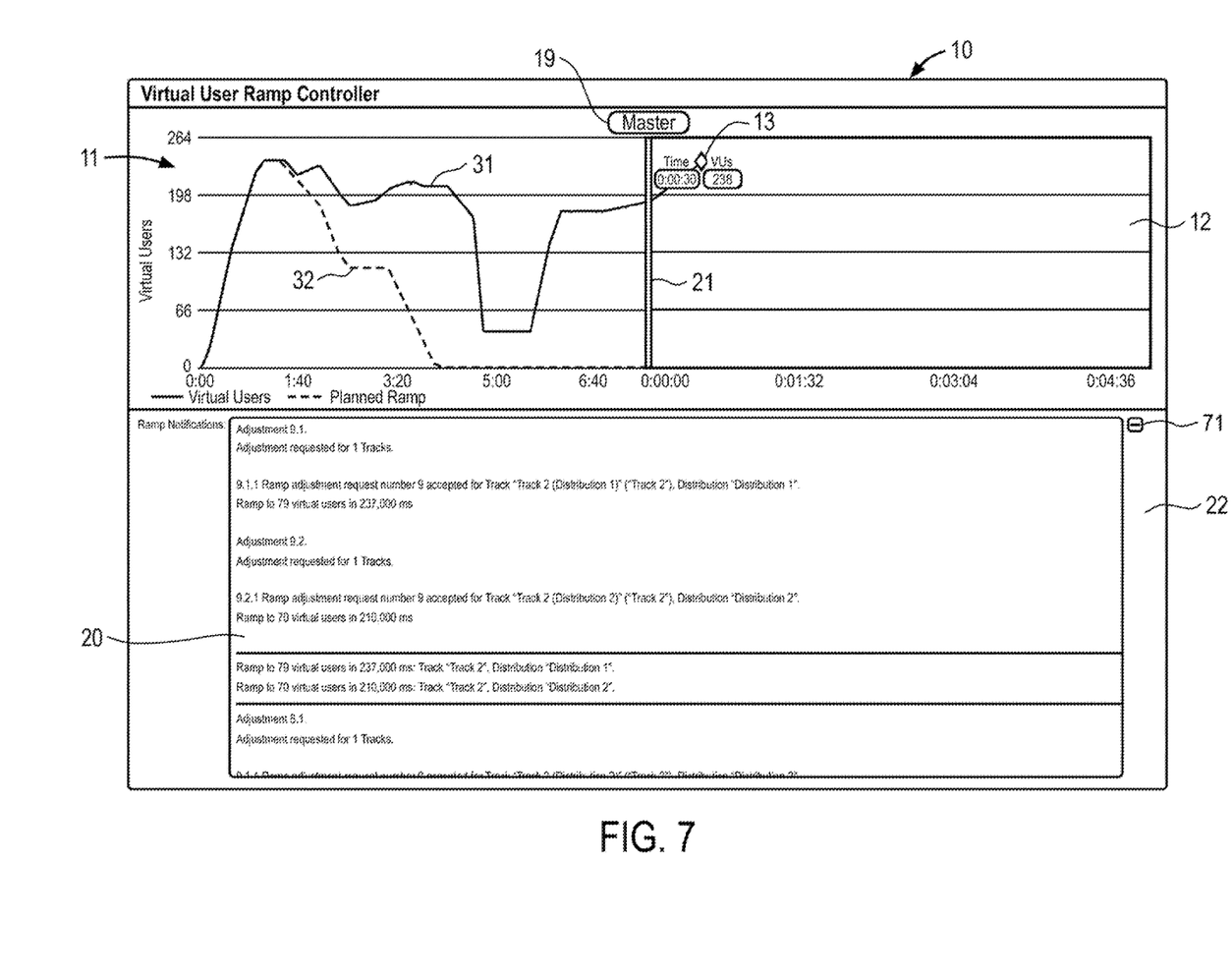
FIG. 7 shows the example graphical user interface window of FIG. 6 following an expansion of a field that shows a log of all adjustments previously made during the running of the load test.

FIG. 6 illustrates an example graphical user interface window 10 with an adjustment made via a Master controller at a fifth point in time during the running of a load test. FIG. 7 shows GUI window 10 of FIG. 6 following an expansion of log field 20, which, in one embodiment, may be effectuated by double-clicking on field 20. The user may scroll through the expanded log text to review adjustments made to the various ramp profiles over the course of the load test. In one embodiment, the user may review the log anytime while the load test is running, or after the load test ends. In this manner, the user can review the exact changes that were made to each distribution. The notations shown in FIG. 7 show the ramp histories to the exact number of VUs over a specified time period for each Track/Distribution.

Figure 8:
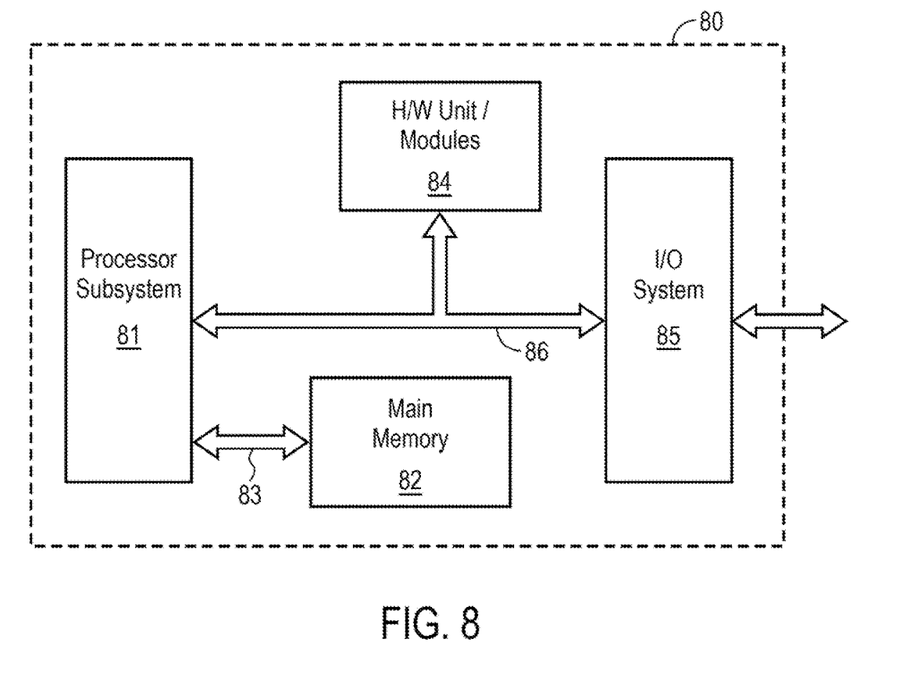
FIG. 8 is a generalized circuit schematic block diagram of a computer device operable to execute a program that implements a graphical user interface according to one embodiment.

FIG. 8 a generalized circuit schematic block diagram of a computing device 80 operable to execute a program that implements embodiments of the graphical user interface disclosed herein. Computing device 80 may be associated with a user who orchestrate changes to the virtual user ramp profiles of a load test on target website or web application. Computing device 80 may comprise a desktop computer, workstation, laptop, tablet, handheld, wearable, or any other computing device that provides a graphical user interface that allows a user to make changes to the VU ramp profiles of a load test in real-time. The user interface may also be web-based or cloud-based so it can be accessed from any display/input device having web-browser capabilities from any location in the world, without installation of specialized software.

As shown, computing device 80 comprises a number of basic subsystems including a processor subsystem 81, a main memory 82 and an input/output (I/O) subsystem 85. Data is transferred between main memory ("system memory") 82 and processor subsystem 81 over a memory bus 83, and between processor subsystem 81 and I/O subsystem 85 over a system bus 86. Examples of the system bus may include the conventional data transport (or hyper transport) bus and the conventional peripheral component interconnect (PCI) bus. Device 80 may also comprise other hardware units/modules 84 coupled to system bus 86 for performing additional data processing, algorithmic or communication functions. Alternatively, these functions may be performed by one or more processors of subsystem 81. Processor subsystem 81 typically comprises one or more processors and a controller device that incorporates a set of functions including a system memory controller, support for one or more system buses and memory access engines.

Figure 9:
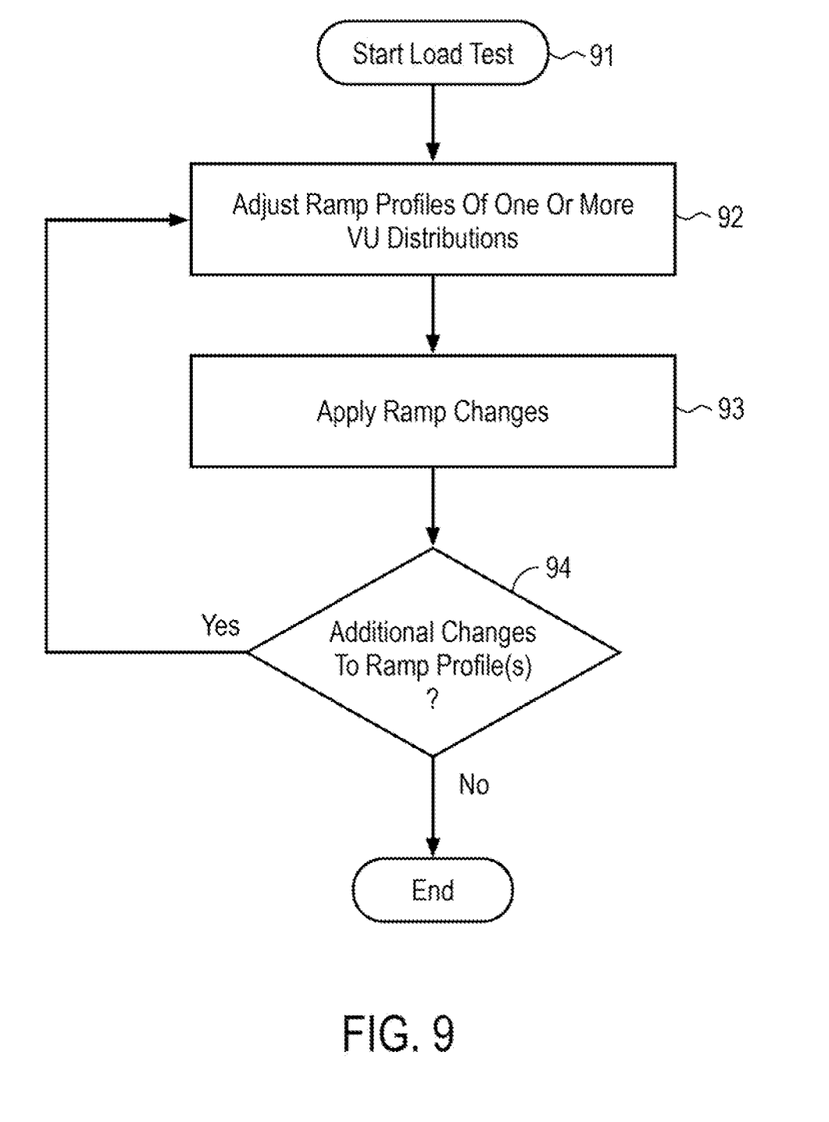
FIG. 9 is an example flow diagram of a method for dynamically adjusting the number of virtual users as a load test runs on a target website or web application.

FIG. 9 is an example flow diagram of a sequence of steps dynamically adjusting the number of virtual users for one or more VU distributions in real-time as a load test of a target website or web application is running. The example process begins with the starting of the load test (block 91), which executes a test composition that simulates a number of different virtual user groups/distributions that perform various activities on the target website or web application. Using the graphical user interface described herein, a user (customer) may selectively adjust the VU ramp profiles of one or more VU distributions (block 92). For instance, in one portion of the GUI the user may click and drag the diamond-shaped icon that extends a graph line, which shows the actual history of a selected VU ramp profile up to a present point, into a field that shows a desired ramp profile in the future. Alternatively, in a mixer panel portion of the GUI the user may move one or more slider or fader switches to add or reduce VUs to individual VU distributions, or to all VU distributions via a master controller slider switch.

When the user is satisfied with the desired adjustments to be made, the user may apply those changes through user input, e.g., clicking on an "Apply Ramp Changes" button of the GUI. This is shown in FIG. 9 in block 93. As the load test continues, the user may decide to make additional changes to one or more of the ramp profiles (block 94). In the event that the user desires to make additional ramp profile changes, the process returns to block 92. If no additional changes are to be made, the process may end when the load test ends or is terminated.

It should be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware, firmware, and software. The machine-readable medium may include, but is not limited to, floppy diskettes, optical disks, CD-ROMs, and magneto-optical disks, ROMs, RAM, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-implemented method comprising:
providing a graphical user interface (GUI) that allows a user to dynamically change virtual user (VU) distributions of a load test performed on a target website or web application, the GUI being provided in a window that includes a first portion that is divided by a vertical line into first and second fields, the first field displaying a graph of a VU ramp history for a given VU distribution as the load test runs, the second field representing user-selected future changes to a current VU ramp profile of one or more VU distributions, the vertical line representing a current, real-time moment of the load test, the GUI allowing the user to make a change to the current VU ramp profile in real-time while the load test is running responsive to a first user input that drags an icon to a position in the second field, the position denoting a future number of VUs at a future time;

sending, by the GUI, instructions to one or more load servers that cause the one or more load servers to adjust a number of VUs according to the change of the current VU ramp profile; and visually displaying in the graph in the first field the change to the current VU ramp profile in real-time as the load test progresses.

2. The computer-implemented method of claim 1 wherein the GUI further allows the user to make the change to the current VU ramp profile responsive to a second user input that moves a slider switch of a mixer panel displayed in a second portion of the window from a current position to a new position.

3. The computer-implemented method of claim 2 wherein the new position is a new vertical position of the slider switch on the mixer panel, a higher vertical position relative to a previous position corresponding to an increase in the future number of VUs, and a lower vertical position relative to a previous position corresponding to a decrease in the future number of VUs.

4. The computer-implemented method of claim 2 wherein the mixer panel comprises a plurality of slider switches, each being associated with a distinct VU distribution.

5. The computer-implemented method of claim 4 wherein the mixer panel further includes a master slider switch that controls a sum total of VUs for all of the distinct VU distributions.

6. The computer-implemented method of claim 5 wherein movement of the master slider switch automatically causes proportional movement of each of the plurality of slider switches associated with each distinct VU distribution.

7. The computer-implemented method of claim 1 wherein the one or more VU distributions each correspond to a different testing parameter and/or VU action.

8. The computer-implemented method of claim 1 wherein the GUI further allows the user to make the change to the current VU ramp profile by application of third user input that includes entry of the future number of VUs and/or the future time in first and second numerical fields, respectively.

9. The computer-implemented method of claim 1 further comprising displaying in a text field of a third portion of the window, a text log that describes a history of all changes previously made to all VU ramp profiles of the load test, the displaying of the text field occurring in real-time as the load test is running.

10. A computer-implemented method comprising:
providing a graphical user interface (GUI) that allows a user to dynamically change virtual user (VU) distributions of a load test performed on a target website or web application, the GUI being provided in a window that includes a first portion that is divided by a vertical line into first and second fields, the first field displaying a graph of a VU ramp history for a given VU distribution as the load test runs, the second field representing user-selected future changes to a current VU ramp profile of one or more VU distributions, the vertical line representing a current, real-time moment of the load test, the GUI allowing the user to make a change to the current VU ramp profile in real-time while the load test is running responsive to a first user input that moves a slider switch of a mixer panel displayed in a second portion of the window from a current position to a new position, the new position denoting a future number of VUs at a future time;
sending, by the GUI, instructions to one or more load servers that cause the one or more load servers to adjust a number of VUs according to the change of the current VU ramp profile; and
visually displaying in the graph in the first field the change to the current VU ramp profile in real-time as the load test progresses.

11. The computer-implemented method of claim 10 wherein the GUI further allows the user to make the change to the current VU ramp profile responsive to a second user input that drags an icon to a position in the second field, the position denoting the future number of VUs at the future time.

12. The computer-implemented method of claim 10 wherein the sending of the instructions occurs responsive to a third user input that applies the change to the current VU ramp profile.

13. The computer-implemented method of claim 10 wherein the new position is a new vertical position of the slider switch on the mixer panel, a higher vertical position relative to a previous position corresponding to an increase in the future number of VUs, and a lower vertical position relative to a previous position corresponding to an decrease in the future number of VUs.

14. The computer-implemented method of claim 10 wherein the mixer panel comprises a plurality of slider switches, each being associated with a distinct VU distribution.

15. The computer-implemented method of claim 10 wherein the mixer panel further includes a master slider switch that controls a sum total of VUs for all of the distinct VU distributions.

16. The computer-implemented method of claim 15 wherein movement of the master slider switch automatically causes proportional movement in the mixer panel of each of the plurality of slider switches associated with each distinct VU distribution.

17. The computer-implemented method of claim 10 wherein the one or more VU distributions each correspond to a different testing parameter and/or VU action.

18. The computer-implemented method of claim 10 wherein the GUI further allows the user to make the change to the current VU ramp profile by application of fourth user input that includes entry of the future number of VUs and/or the future time in first and second numerical fields, respectively.

19. The computer-implemented method of claim 10 further comprising displaying in a text field of a third portion of the window, a text log that describes a history of all changes previously made to all VU ramp profiles of the load test, the displaying of the text field occurring in real-time as the load test is running.

20. A non-transitory computer-readable storage medium encoded with a computer program, which, when executed by one or more processors, operable to:
provide a graphical user interface (GUI) that allows a user to dynamically change virtual user (VU) distributions of a load test performed on a target website or web application, the GUI being provided in a window that includes a first portion that is divided by a vertical line into first and second fields, the first field displaying a graph of a VU ramp history for a given VU distribution as the load test runs, the second field representing user-selected future changes to a current VU ramp profile of one or more VU distributions, the vertical line representing a current, real-time moment of the load test, the GUI allowing the user to make a change to the current VU ramp profile in real-time while the load test is running responsive to a first user input that moves a slider switch of a mixer panel displayed in a second portion of the window from a current position to a new position, the new position denoting a future number of VUs at a future time;

send, by the GUI, instructions to one or more load servers that cause the one or more load servers to adjust a number of VUs according to the change of the current VU ramp profile; and visually display in the graph in the first field the change to the current VU ramp profiled in real-time as the load test progresses.

21. The non-transitory computer-readable storage medium of claim 20 wherein the computer program, when executed, is further operable to change to the current VU ramp profile responsive to a second user input that moves a slider switch of a mixer panel displayed in a second portion of the window from a current position to a new position.

22. The non-transitory computer-readable storage medium of claim 21 wherein the new position is a new vertical position of the slider switch on the mixer panel, a higher vertical position relative to a previous position corresponding to an increase in the future number of VUs, and a lower vertical position relative to a previous position corresponding to an decrease in the future number of VUs.

23. The non-transitory computer-readable storage medium of claim 21 wherein the mixer panel comprises a plurality of slider switches, each being associated with a distinct VU distribution.

24. The non-transitory computer-readable storage medium of claim 23 wherein the mixer panel further includes a master slider switch that controls a sum total of VUs for all of the distinct VU distributions.

25. The non-transitory computer-readable storage medium of claim 20 wherein the one or more VU distributions each correspond to a different testing parameter and/or VU action.

26. The non-transitory computer-readable storage medium of claim 20 wherein the computer program, when executed, is further operable to change to the current VU ramp profile responsive to third user input that includes entry of the future number of VUs and/or the future time in first and second numerical fields, respectively.

\* \* \* \* \*